(12) United States Patent
Chen et al.

(10) Patent No.: US 9,412,146 B2
(45) Date of Patent: Aug. 9, 2016

(54) SYSTEM AND METHOD FOR DISTRIBUTED VIRTUALIZATION OF GPUS IN DESKTOP CLOUD

(71) Applicant: FutureWei Technologies, Inc., Plano, TX (US)

(72) Inventors: Pu Chen, Shenzhen (CN); Guangsong Xia, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 241 days.

(21) Appl. No.: 14/063,873

(22) Filed: Oct. 25, 2013

(65) Prior Publication Data

US 2015/0116335 A1 Apr. 30, 2015

(51) Int. Cl.
*G06F 13/14* (2006.01)
*G06T 1/20* (2006.01)

(52) U.S. Cl.
CPC .......................................... *G06T 1/20* (2013.01)

(58) Field of Classification Search
None
See application file for complete search history.

(56) References Cited

U.S. PATENT DOCUMENTS

| | | | | |
|---|---|---|---|---|
| 6,732,269 B1 * | 5/2004 | Baskey | ................. | H04L 63/166 713/153 |
| 8,516,240 B1 * | 8/2013 | Wang | ..................... | H04L 67/38 713/150 |
| 2009/0125968 A1 * | 5/2009 | Perlman | .................. | A63F 13/12 725/133 |
| 2009/0300167 A1 * | 12/2009 | Jones | .................... | G06F 15/173 709/224 |
| 2009/0307428 A1 * | 12/2009 | Schmieder | ............ | G06F 3/1462 711/118 |
| 2013/0018946 A1 * | 1/2013 | Brown | ................ | G06F 11/1451 709/203 |
| 2013/0268575 A1 * | 10/2013 | Xu | ...................... | H04L 67/1029 709/202 |
| 2014/0019571 A1 * | 1/2014 | Cardona | ................. | G06F 13/28 709/212 |

* cited by examiner

*Primary Examiner* — Kee M Tung
*Assistant Examiner* — Frank Chen
(74) *Attorney, Agent, or Firm* — Slater Matsil, LLP

(57) ABSTRACT

Embodiments are provided to enable graphic processing unit (GPU) virtualization for high bandwidth or rate demanding applications, such as 3D gaming, where a client communicates with a host via a virtual desktop infrastructure (VDI). The distributed GPU virtualization allows one or more VMs or comparable hosts or components without GPU access to communicate with a GPU at a different component or physical machine in a data center or a network using remote direct memory access (RDMA). A first physical machine that excludes a GPU starts a remote display driver function to handle a request to render graphics from a client via gateway. A second physical machine that comprises a GPU is instructed to start a render function for the client using the GPU. The render function communicates with the remote display driver function at the first physical machine. The rendered graphics is then sent to the client via the gateway.

27 Claims, 4 Drawing Sheets

SYSTEM AND METHOD FOR DISTRIBUTED VIRTUALIZATION OF GPUS IN DESKTOP CLOUD

TECHNICAL FIELD

The present invention relates to graphics processing, and, in particular embodiments, to a system and method for distributed virtualization of graphic processing units (GPUs) in desktop cloud environment.

BACKGROUND

In applications where graphics processing for a user or client is implemented remotely, such as on a virtual machine (VM) via a remote virtual desktop infrastructure (VDI), image/video data (e.g., for 3D graphics) can be rendered into a suitable format for display using a graphics processing unit (GPU) on a remote physical server. The rendered data is then remotely displayed at the client device. OpenGL is a graphics library that depends on GPU. Programmers use OpenGL application programming interface (API) to access the library to write graphics intensive programs such as Computer-Aided Design (CAD) or games. For some programs, such as games, the programs simulate real world objects with computer generated graphics.

OpenGL supports hardware based rendering for 3D graphics using a GPU, where hardware vendors can provide drivers for GPU rendering. However, some current physical machines with VMs may not comprise GPUs due to cost and possibly other resource limitations. In some scenarios, no or a limited number of VMs in a data center or network may directly access and use a GPU. In such cases, there is a need for a mechanism that enables the VMs without GPU access to access a GPU with sufficient performance to keep up with the fast data rate requirements of relatively high rate applications such as 3D gaming, or any other high data rate demanding remote desktop based applications that require 3D graphics rendering such as 3D CAD tools.

SUMMARY OF THE INVENTION

In accordance with an embodiment, a method for supporting distributed virtualization of graphic processing in a remote desktop environment includes detecting, at a management and control component, a request at a gateway from a client to render graphics for remote display at the client, and instructing a first physical machine that excludes a graphic processing unit (GPU) to start a remote display driver function to handle the request, wherein the first physical machine is assigned as a host for the client. A second physical machine that comprises a GPU is also instructed to start a render function for rendering graphics for the client using the GPU. The render function communicates with the remote display driver function at the first physical machine.

In accordance with another embodiment, a network component for supporting distributed virtualization of graphic processing in a remote desktop environment a processor and a computer readable storage medium storing programming for execution by the processor. The programming includes instructions to detect a request at a gateway from a client to render graphics for remote display at the client. The network component instructs a first physical machine that excludes a GPU to start a remote display driver function to handle the request, wherein the first physical machine is assigned as a host for the client. The network component further instructs a second physical machine that comprises a GPU to start a render function for rendering graphics for the client using the GPU, wherein the render function communicates with the remote display driver function at the first physical machine.

In accordance with another embodiment, a method for supporting distributed virtualization of graphic processing in a remote desktop environment includes receiving, at a gateway, a request from a client to render graphics for remote display at the client. The gateway then sends the request to a first physical machine that excludes a GPU to start a remote display driver function to handle the request, wherein the first physical machine is assigned as a host for the client. The gateway also receives from a second physical machine that comprises a GPU graphics data associated with the request for remote display at the client. The graphics data is rendered using the GPU at the second physical machine. The gateway then forwards the graphics data to the client.

In accordance with another embodiment, a network component for supporting distributed virtualization of graphic processing in a remote desktop environment a processor and a computer readable storage medium storing programming for execution by the processor. The programming includes instructions to receive a request from a client to render graphics for remote display at the client, and send the request to a first physical machine that excludes a GPU to start a remote display driver function to handle the request, wherein the first physical machine is assigned as a host for the client. The network component then receives, from a second physical machine that comprises a GPU, graphics data associated with the request for remote display at the client, wherein the graphics data is rendered using the GPU at the second physical machine. The received graphics data is then forwarded from the network component to the client.

In accordance with another embodiment, a method for supporting distributed virtualization of graphic processing in a remote desktop environment includes receiving, at a first physical machine that excludes a GPU, a request from a remote client via a gateway to render graphics for remote display at the client. The first physical machine is assigned as a host for the client. The method further includes starting at the first physical machine a remote display driver function to handle the request and sending graphics data associated with the request to a second physical machine that comprises a GPU to render the graphics data using the GPU.

In accordance with another embodiment, a network component for supporting distributed virtualization of graphic processing in a remote desktop environment includes a processor and a computer readable storage medium storing programming for execution by the processor. The programming includes instructions to receive a request from a remote client via a gateway to render graphics for remote display at the client. The network component is assigned as a host for the client, and the processor is a non-GPU processor unsuitable for rendering the graphics data. The network component hence starts, at the first physical machine, a remote display driver function to handle the request and sends graphics data associated with the request to a second network component that comprises GPU to render the graphics data using the GPU.

In accordance with another embodiment, a method for supporting distributed virtualization of graphic processing in a remote desktop environment includes receiving, at a physical machine comprising a GPU, instructions to start a render function for rendering graphics for a client using the GPU. The method further includes receiving, from a remote display driver at a host physical machine that excludes a GPU, graphics data for rendering, wherein the host physical machine is assigned to handle remote display of the graphics at the client.

The graphics data is rendered using the render function and the GPU and then sent to a gateway that forwards the graphics data to the client.

In accordance with yet another embodiment, a network component for supporting distributed virtualization of graphic processing in a remote desktop environment includes at least one processor including a GPU and a computer readable storage medium storing programming for execution by the at least one processor. The programming including instructions to receive instructions to start a render function for rendering graphics for a client using the GPU, and receive, from a remote display driver at a host physical machine that excludes a GPU, graphics data for rendering. The host physical machine is assigned to handle remote display of the graphics at the client. The network component then renders the graphics data using the render function and the GPU. The rendered graphics data is sent to a gateway that forwards the graphics data to the client.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A virtualized GPU allows desktop clouds to support high end graphics, such as for OpenGL and Direct3D (D3D) standards. Typical available GPU virtualization systems require using a GPU in the host (e.g., a server or hypervisor at a data center). The host may communicate with a user or a client via a desktop application at the client device and using the cloud, e.g., the Internet and/or any other suitable network(s). Some applications also require having a GPU at the host. For example, a 3D video/image processing virtual machine requires access to a GPU. Upgrading an existing host system to support a GPU can be challenging, such as in terms of cost and design. For example, in many host systems, hardware does not support GPU at all due to card size, energy consumption, or other practical issues.

Emerging technologies, such as remote direct memory access (RDMA) can be used to optimize communication performance inside a data center network. This may be suitable for GPU virtualization applications that use relatively high bandwidth. For instance, GPU virtualization systems for 3D gaming may need about 100 megabits/sec (mbts) of compressed data versus about 500 mbts of uncompressed data. This bandwidth is suitable for a distributed GPU system in a data center network. Embodiments are provided herein to enable a GPU virtualization solution for such high bandwidth/rate demanding applications, for instance for 3D gaming or other 3D imaging systems. The GPU virtualization solution uses distributed virtualization of GPUs in a desktop/cloud environment, e.g., where a client communicates with a host via a remote desktop or VDI and access via the cloud. The provided distributed GPU virtualization allows one or more VMs (or comparable hosts/components) without GPU access to communicate with a GPU at a different component or physical machine in a data center or a network using a RDMA based protocol and a gateway to the client, as described below. The embodiments herein can be implemented for virtualizing 3D gaming applications, other imaging applications, or any suitable application in a desktop/cloud based graphics rendering environment that may benefit from improved (fast) communication performance of the system.

Figure 1:
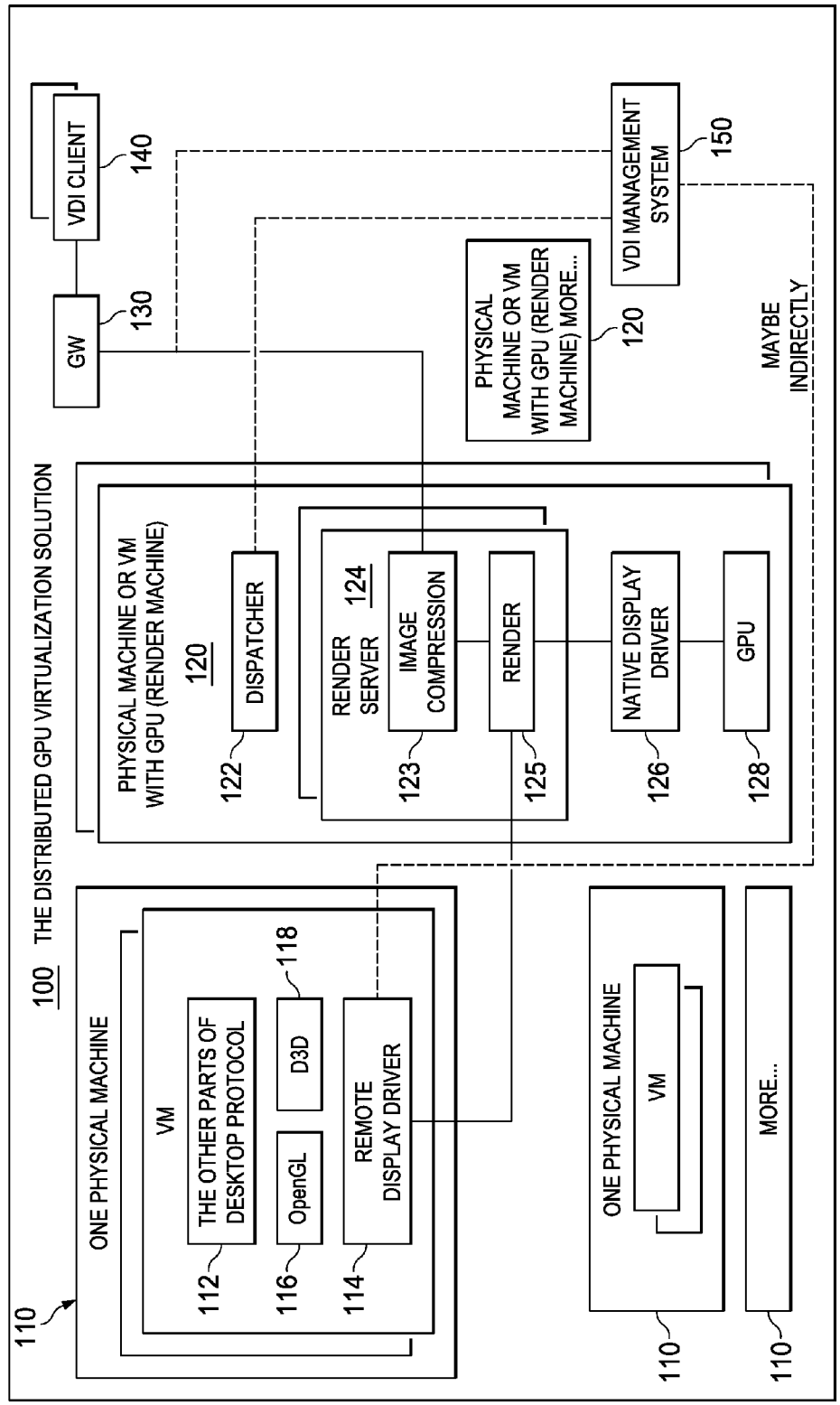
FIG. 1 illustrates an embodiment architecture for distributed virtualization of GPUs in a desktop/cloud environment.

FIG. 1 shows an embodiment architecture 100 for distributed virtualization of GPUs in a desktop/cloud environment. The architecture 100 comprises one or more first hosts or physical machines 110, one or more second hosts or physical machines 120, a gateway 130, a client 140, and a management system 150. These components may communicate or may be coupled to each other as shown in FIG. 1 or in any other suitable arrangement that serves similar functions or purpose below. For example, the components may be located in the same data center or in one or more connected networks. The components may be separated into different physical components (as shown in FIG. 1). However, in other embodiments, at least some of the components may be combined into the same physical component, e.g., a server, a workstation, or any suitable network node (e.g., router or switch).

A first physical machine 110 may be any suitable physical component or unit (e.g., server, hypervisor, or network card) that does not comprise a GPU or has no direct GPU access. The first physical machine 110 comprises components or function blocks that may be implemented via software and/or hardware, including at least one virtual machine (VM) 112 for handling client requests from the client 140 (via the gateway 130), and a remote display driver 114 for processing data for display at the client. The first physical machine 110 or its components are configured to implement and run OpenGL 116 and/or D3D 118 for desktop/cloud based services, or other similar resource demanding services and applications.

A second physical machine 120 may be any suitable physical component or unit (e.g., server, hypervisor, or network card) that comprises a GPU or has a direct GPU access. The second physical machine 120 comprises a plurality of component blocks that may be implemented via hardware, software, or both, including a dispatcher 122 for initiating one or more render servers 124 (e.g., an application via software). Each render server 124 comprises an image compression block 123 and a render 125 for handling rendering requests from the remote display driver 114. The second physical machine 120 also includes a GPU 128 and a native display driver 126 that handles communications between the render 125 and the GPU 128.

The dispatcher 122 at a second physical machine 122, for instance when triggered by the management system 150, may establish more than one render server 124 to handle more than one request from one or more clients 140. At each render server 124, the render 125 forwards the graphics data for the client 140 from the remote display driver 114 to the native display driver 126 for graphics rendering. The image compression block 123 then receives the rendered graphics from the GPU 128 via the native display driver 126 (with or without the render 125), implements standard compression format (e.g., MPEG) with or without additional compression to meet the data rate or bandwidth requirement and hence high quality user experience in terms of speed, and forwards the compressed data to the gateway 130.

The gateway 130 may be any suitable physical or logical (software) component or unit that mitigates and handles communications, including graphics rendering requests and returned compressed rendered graphics data, between the client 140 and each of the first physical machine 110 and the second physical machine 120. The gateway 130 may be an independent physical component from the first physical machine 110 and the second physical machine 120. In some embodiments, the gateway 130 may be allocated on the same physical component with one or more other components, for example with a first physical machine 110, a second physical machine 120, or the management system 150.

The client 140 may be any device, e.g., a computer or communication device such as a desktop computer, a laptop computer, a computer tablet, or a smartphone. The client 140 communicates with the first physical machine 110 (the host) via the gateway 130 to process a 3D (or 2D) graphics video/image application, for example to display 3D video for a game or 3D images for a CAD tool on the device, via remote desktop or VDI through the cloud or Internet. Other applications that use the remote desktop or VDI and have similar bandwidth or data rate requirements may also use the architecture 100.

The management system 150 may be any suitable physical or logical (software) component configured to control the operations of some of the other components/blocks, including the gateway 130, the remote display driver 114, and the dispatcher 122. Upon detecting a request for rendering graphics from the client 140, the management system 150 configures the gateway 130 and starts the dispatcher 122 and the remote display driver 114 to handle the request.

In an embodiment, when the VDI client 140 sends a request to the VDI host, the gateway 130 intercepts the request and forwards it to the VM 112 at a first physical machine 110. The VDI management system 150 can also detect the request at the gateway 130 and initiate the remote display driver 114. The VM 112 forwards the needed request information to the remote display driver 114 to render graphics for display. In turn, the remote display driver 114 communicates using RDMA with the render 125 at a second physical machine 120. The RDMA permits the first physical machine 110 to use the GPU resources at the second physical machine 120 and bypass CPU processing at the first physical machine 110. The RDMA communication also allows sending relatively large data at relatively high speed between the physical machines, for example within a data center. This high speed is suitable and sufficient to meet the data rate requirement, e.g., for 3D graphics rendering in 3D gaming, and achieve high quality user experience. The integration of the gateway 130 in the architecture 100 for distributed virtualization removes the need to send data back to the VM 112 or the first physical machine 110 before sending the data to the client 140, which reduces delay. This also reduces the complexity and safety risks introduced by having otherwise multiple connections to the client 140. Having a single connection between the gateway 130 and the client 140 (over the cloud) reduces safety risks (e.g., malicious attacks) since all other connections between the components can be sufficiently secured in a data center. The connection between the gateway 130 and the client 140 may be a transmission control protocol (TCP) connection. Alternatively, a more secure user datagram protocol (UDP) connection can be used between the gateway 130 and the client 140.

Figure 2A:
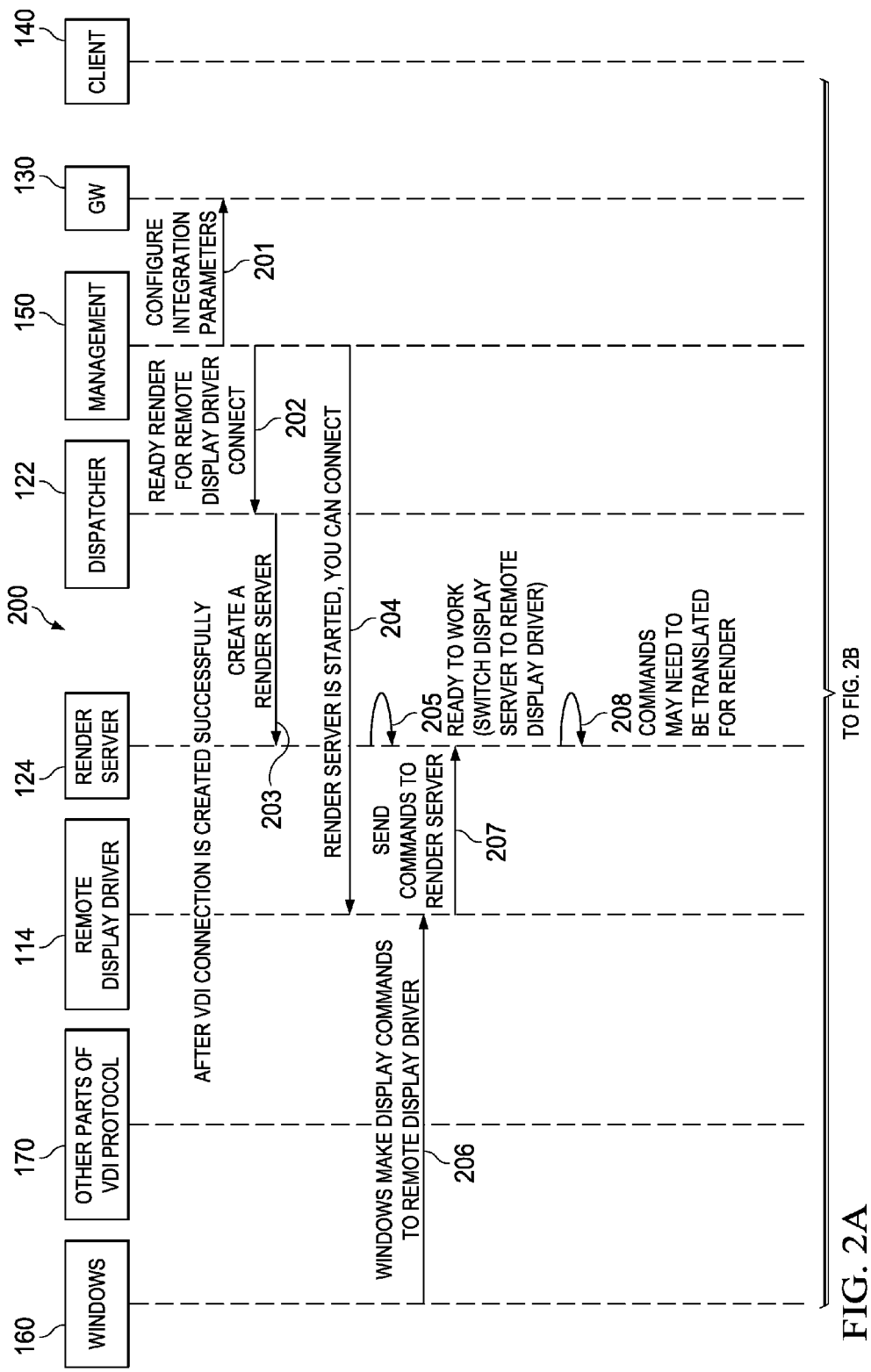
FIGS. 2A and 2B illustrate an embodiment method for a protocol exchange between components of the architecture in FIG. 1.
Figure 2B:
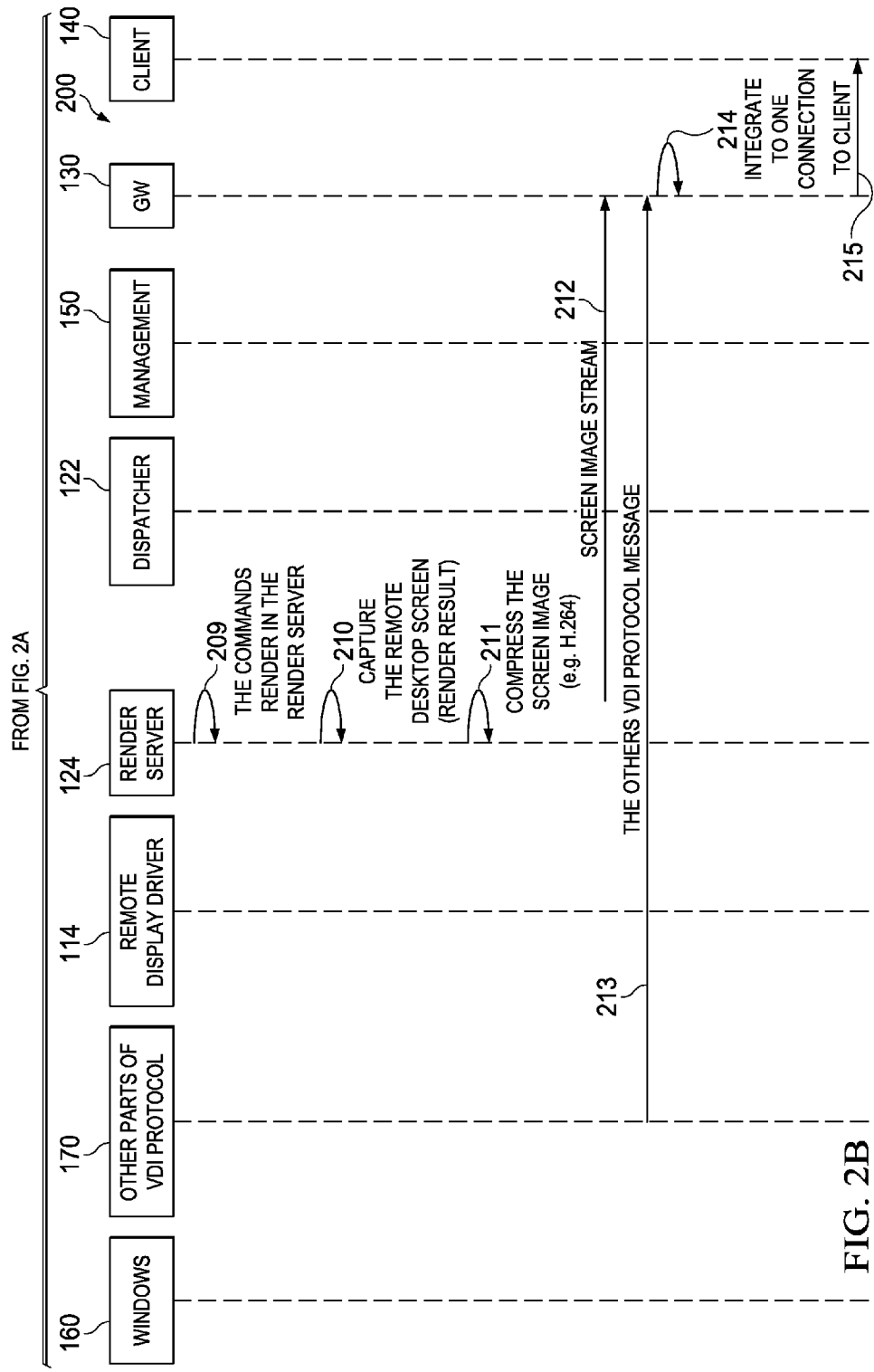

FIGS. 2A and 2B show an embodiment method 200 for a protocol exchange between components of the architecture 100. After a VDI connection is established successfully, e.g., via the cloud between the client 140 and the host or gateway 130, the management system 150 detects the connection or request from the client 140 and, at step 201, configures the gateway 130 using suitable integration parameters. The integration parameters may indicate addresses of the client 140 and the corresponding first host or physical machine 110, and bind the two to a session associated with the request of the client 140, e.g., using a session ID. The session ID is bound to the two entities and sent by the management system 150 to the gateway 130. This enables the gateway 130 to identify the later received rendered data from the render server 124 as intended for the client 140. The received data also indicates the same session, e.g., includes the session ID. Thus, the gateway 130 can match the data to the session of the client 140 (by matching the session ID in the rendered data), and hence forward the data properly to the client 140. This configuration step eliminates having to resend the rendered data from the second physical machines 120 back to the host or first physical machine 110 and subsequently to the gateway 130. Instead the gateway 130 sends back the rendered graphics data directly from the second physical machines 120 to the client 140, which reduces burden on the VM, avoids further delay, and improves user experience. The step 201 can be performed using a handshake protocol or exchange between the management system 150 and the gateway 130. At step 202, the management system 150 sends the dispatcher 122 a command to ready a render or a render server 124 to connect to the remote display driver 114. At step 203, the dispatcher 122 sends a command to start the render server 124. At step 204, the management system 150 sends a notification to the remote display driver 114 to connect to the render server 124 that is ready. At step 205, the remote display driver 114 gets ready to work and handle the request. This includes switching the display driver to the remote display driver mode (to connect to the render server 124 at a different physical machine 120 with GPU 128).

At step 206, an interface platform or operating system 160 (e.g., Windows™), e.g., at the client 140 or the first physical machine 110, connects to the remote display driver 114. At step 207, the remote display driver 114 sends a command to the render server 124 to render graphics data. At step 208, the render server 124 translates the command for rendering. At step 209, the render server 124 initiates a command to start rendering (start the render 125) using the native display driver 126 and the GPU 128. At step 210, the render server 124 captures the remote desktop screen or image (the result from the render 125). At step 211, the render server 124 compresses the screen image (e.g., in H.264 format) using the image compression block 123. At step 212, the render server 124 sends the screen image stream to the gateway 130. At step 213, other parts of the VDI protocol 170 may send VDI messages regarding the request or its rendered graphics to gateway 130. At step 214, the gateway 130 integrates all the received data to one connection or session of the client 130. At step 215, the gateway 130 sends the compressed rendered graphics for display to the client 140. In other embodiments, some of the steps above may be omitted, combined, or implemented in a different order in any other suitable manner that serves the same outcome or purpose. Additional steps or commands may also be added to this protocol.

Figure 3:
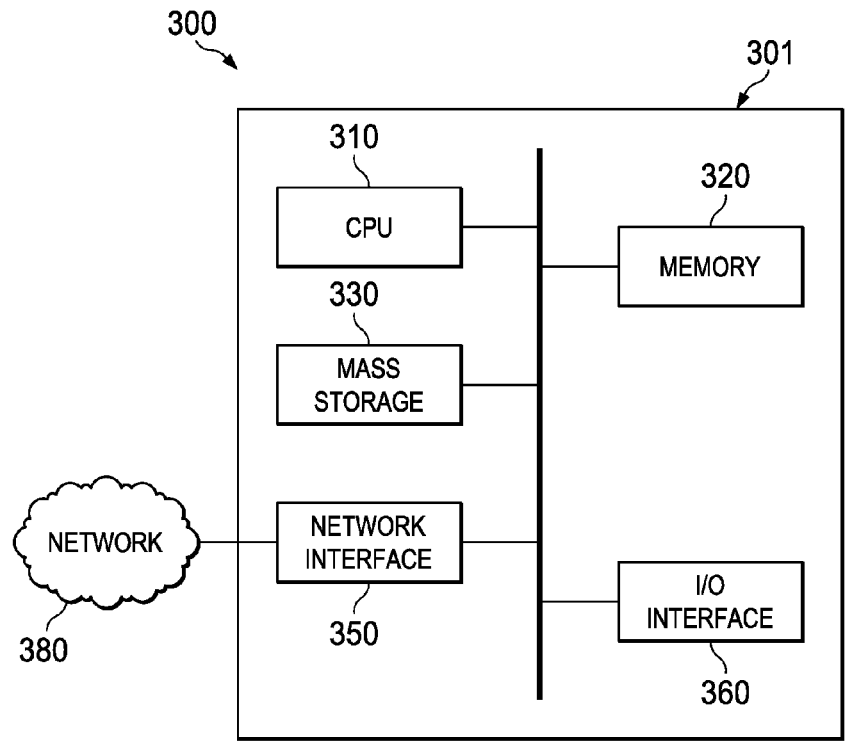
FIG. 3 is a diagram of a processing system that can be used to implement various embodiments.

FIG. 3 is a block diagram of a processing system 300 that can be used to implement various embodiments. The processing system 300 may be part of or correspond to the first host or physical machine 110 that lacks a GPU. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

Figure 4:
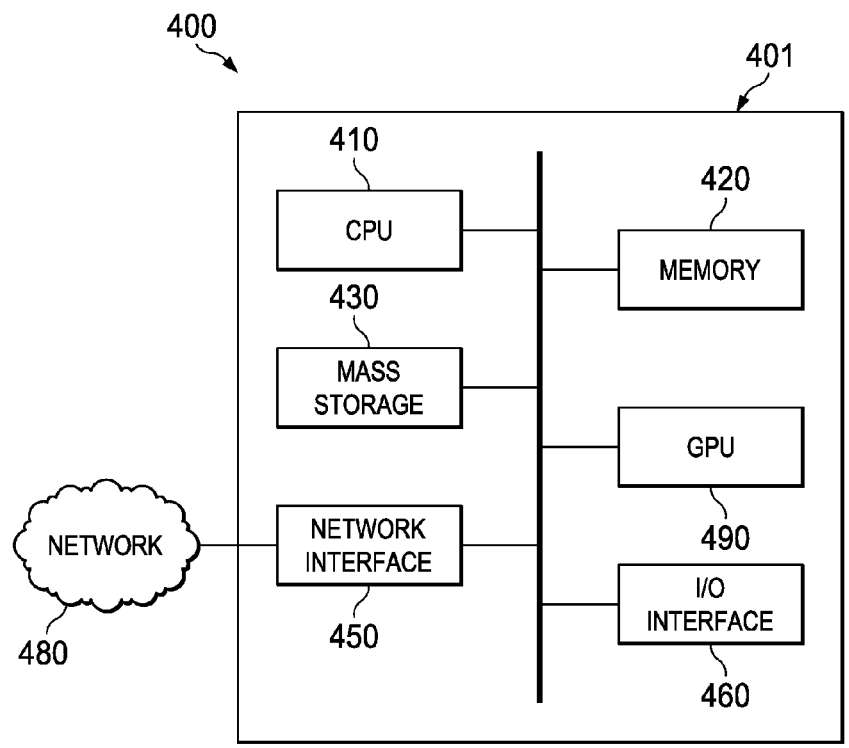
FIG. 4 is a diagram of another processing system that can be used to implement various embodiments.

FIG. 4 is a block diagram of another processing system 400 that can be used to implement various embodiments. The processing system 400 may be part of or correspond to the second hosts or physical machines 120 including a GPU 490. The GPU 490 is a processing unit configured or optimized for handling graphics data including rendering of 3D graphics into a suitable format for display. Other component of the processing system 400 include a CPU 410, e.g., for more general data processing, a memory 420, a mass storage device 430, a network interface 450, and I/O interface 460 to access nodes or one or more networks 480. Such components may be similar to the corresponding components above of the processing system 300.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a management and control component for supporting distributed virtualization of graphic processing in a remote desktop environment, the method comprising:
   detecting a request from a client to render graphics for remote display at the client;
   sending, by the management and control component an instruction directly to a second physical machine before sending a notification to a remote display driver function at a first physical machine lacking a graphic processing unit (GPU), the instruction instructing the second physical machine to start a render function at the second physical machine for rendering graphics for the client in response to the request, and the second physical machine comprising a GPU; and
   sending the notification to the remote display driver function at the first physical machine, the notification instructing the remote display driver function to connect to the render function at the second physical machine to handle the request, wherein the first physical machine is assigned as a host for the client.

2. The method of claim 1 further comprising configuring, using integration parameters, a gateway to forward the request with associated graphics data to the first physical machine and subsequently forward rendered graphics data for remote display from the second physical machine to the client bypassing the first physical machine.

3. The method of claim 2, wherein the gateway is configured to associate the rendered graphics data from the second physical machine with the request from the client to the first physical machine as the host of the client.

4. The method of claim 3, wherein configuring the gateway using the integration parameters comprises:
   binding a session identifier (ID) associated with the request to addresses of the client and the first physical machine; and
   sending the session ID associated with the addresses of the client and the first physical machine to the gateway, wherein the session ID enables the gateway to associate the rendered graphics data from the second physical machine with a session of the client by matching the session ID in the rendered graphics data, and directly forward the rendered graphics data from the second physical machine to the client.

5. The method of claim 1 further comprising:
sending, to a dispatcher at the second physical machine, a command to start the render function; and
sending, to a remote display driver at the first physical machine, a notification that the render function is ready to connect to the remote display driver function.

6. A network component for managing and controlling distributed virtualization of graphic processing in a remote desktop environment, the network component comprising:
a processor; and
a computer readable storage medium storing programming for execution by the processor, the programming including instructions to:
detect a request from a client to render graphics for remote display at the client;
send an instruction directly to a second physical machine before sending a notification to a remote display driver function at a first physical machine lacking a graphic processing unit (GPU), the instruction instructing the second physical machine to start a render function at the second physical machine for rendering graphics for the client in response to the request, and the second physical machine comprising a GPU; and
send the notification to the remote display driver function at the first physical machine, the notification instructing the remote display driver function to connect to the render function at the second physical machine to handle the request, wherein the first physical machine is assigned as a host for the client.

7. The network component of claim 6, wherein the first physical machine and the second physical machine are coupled to the network component in a data center, and wherein the data center is coupled to the client via a cloud network or Internet.

8. A method implemented by a gateway for supporting distributed virtualization of graphic processing in a remote desktop environment, the method comprising:
receiving a request from a client to render graphics for remote display at the client;
forwarding the request to a first physical machine lacking a graphic processing unit (GPU), wherein the first physical machine is assigned as a host for the client;
receiving, from a management component, configuration parameters enabling the gateway to forward data associated with the request directly to the client;
receiving, by the gateway, rendered graphics data from a second physical machine comprising a GPU for remote display at the client, the rendered graphics data being associated with the request, and the rendered graphics data bypassing the first physical machine when being communicated from the second physical machine to the gateway; and
forwarding, by the gateway, the rendered graphics data directly from the second physical machine to the client in accordance with the configuration parameters upon receiving the rendered graphics data.

9. The method of claim 8, wherein the configuration parameters from the management component include a session identifier (ID) associated with the request and addresses of the client and the first physical machine, and wherein the method further includes:
upon receiving the rendered graphics data from the second physical machine, matching the session ID in rendered graphics data; and
associating the rendered graphics data with a session of the client.

10. The method of claim 8 further comprising:
receiving, as part of a virtual desktop infrastructure (VDI) protocol, VDI messages regarding the request or graphics data associated with the request; and
integrating the VDI messages with the rendered graphics data from the second physical machine into one connection to the client.

11. The method of claim 8 further comprising receiving the request from the client and forwarding the rendered graphics data to the client using a transmission control protocol (TCP) connection.

12. The method of claim 8 further comprising receiving the request from the client and forwarding the rendered graphics data to the client using a secure user datagram protocol (UDP) connection.

13. A network gateway for supporting distributed virtualization of graphic processing in a remote desktop environment, the network gateway comprising:
a processor; and
a computer readable storage medium storing programming for execution by the processor, the programming including instructions to:
receive a request from a client to render graphics for remote display at the client;
forward the request to a first physical machine lacking a graphic processing unit (GPU), wherein the first physical machine is assigned as a host for the client;
receive, from a management component, configuration parameters enabling the network gateway to forward data associated with the request directly to the client;
receive, from a second physical machine that comprises a GPU, rendered graphics data associated with the request for remote display at the client, the rendered graphics data bypassing the first physical machine when being communicated from the second physical machine to the network gateway; and
forward rendered graphics data directly from the second physical machine to the client in accordance with the configuration parameters upon receiving the rendered graphics data.

14. The network gateway of claim 13, wherein the first physical machine, the second physical machine, and the network gateway are located in a data center and configured to exchange data for rendering graphics of the request using remote direct memory access (RDMA).

15. A method for supporting distributed virtualization of graphic processing in a remote desktop environment, the method comprising:
receiving, by a first physical machine, a request from a remote client via a gateway, the request including graphics and requesting to render the graphics for remote display at the remote client, and the first physical machine lacking a graphic processing unit (GPU), wherein the first physical machine is assigned as a host for the remote client;
starting a remote display driver function in the first physical machine to handle the request;
receiving, by the remote display driver function in the first physical machine, a notification from a management component after a render function at a second physical machine comprising a GPU has been started by the management component in response to the request, the notification instructing the remote display driver function in the first physical machine to connect to the render function at the second physical machine to handle the request; and sending the graphics included in the request to the second physical machine to render the graphics using the GPU.

16. The method of claim 15, wherein the request is received from the gateway and the graphics included in the request are sent to the second physical machine using remote direct memory access (RDMA), and wherein the RDMA bypasses rendering the graphics included in the request using a central processing unit (CPU) at the first physical machine.

17. The method of claim 15, wherein the request including the graphics is for a three-dimensional video game or a Computer-Aided Design (CAD) application at the remote client.

18. A first physical server without a graphic processing unit (GPU) configured for supporting distributed virtualization of graphic processing in a remote desktop environment, the first physical server comprising:

a non-GPU processor; and a computer readable storage medium storing programming for execution by the non-GPU processor, the programming including instructions to:

receive, from a remote client via a gateway, a request including graphics and requesting to render the graphics for remote display at the remote client, wherein the first physical server is assigned as a host for the remote client;

start a remote display driver function in the first physical server to handle the request;

receive a notification from a management component after a render function at a second physical server comprising a GPU has been started by the management component in response to the request, the notification instructing the remote display driver function in the first physical server to connect to the render function in the second physical server to handle the request; and send the graphics included in the request to the second physical server to render the graphics using the GPU.

19. The first physical server of claim 18, wherein the programming includes further instructions to receive and send the request including the graphics using remote direct memory access (RDMA), and wherein the RDMA bypasses rendering the graphics using the non-GPU processor at the first physical server.

20. A method implemented by a physical machine comprising a graphic processing unit (GPU) configured for supporting distributed virtualization of graphic processing in a remote desktop environment, the method comprising:

receiving, from a management component, instructions to start a render function for rendering graphics for a client using the GPU in response to a request from the client;

receiving, from a remote display driver at a host physical machine lacking a GPU, graphics associated with the request for rendering the graphics, wherein the host physical machine is assigned to handle remote display of the graphics at the client and the host physical machine connects with the physical machine after the render function for rendering graphics has been started in response to the request;

rendering the graphics using the render function and the GPU; and sending the rendered graphics to a gateway that forwards the rendered graphics to the client, the rendered graphics bypassing the host physical machine when being sent by the physical machine to the gateway.

21. The method of claim 20, wherein the graphics associated with the request to render the graphics is received from the host physical machine and the rendered graphics is sent to the gateway using remote direct memory access (RDMA).

22. The method of claim 20 further comprising compressing the rendered graphics at the physical machine before sending the compressed rendered graphics to the gateway.

23. The method of claim 20 further comprising translating the graphics received from the remote display driver before sending the graphics to the GPU for rendering the graphics.

24. The method of claim 20 further comprising starting a render function to render the graphics for each individual request from a client.

25. A physical server configured for supporting distributed virtualization of graphic processing in a remote desktop environment, the physical server comprising:

at least one processor including a graphic processing unit (GPU); and a computer readable storage medium storing programming for execution by the at least one processor, the programming including instructions to:

receive, from a management component, instructions to start a render function for rendering graphics for a client using the GPU in response to a request from the client;

receive, from a remote display driver at a host physical server lacking a GPU, graphics associated with the request for rendering the graphics, wherein the host physical server is assigned to handle remote display of the graphics at the client and the host physical server connects with the physical server after the render function for rendering graphics has been started in response to the request;

render the graphics using the render function and the GPU; and send the rendered graphics to a gateway that forwards the rendered graphics to the client, the rendered graphics bypassing the host physical server when being sent by the physical server to the gateway.

26. The physical server of claim 25, wherein the programming includes further instructions to compress the rendered graphics before sending the compressed rendered graphics to the gateway.

27. The physical server of claim 25, wherein the programming includes further instructions to receive the graphics from the host physical server and send the rendered graphics to the gateway using remote direct memory access (RDMA).

* * * * *